Z. W. Lee.
Cotton Bale Tie.

Nº 58,844.     Patented Oct. 16, 1866.

Witnesses            Inventor.
Chas. D. Smith        Z. W. Lee.
R. C. Weightman     By Munn & Co.
                                  attys

UNITED STATES PATENT OFFICE.

Z. W. LEE, OF BLAKELY, GEORGIA.

IMPROVEMENT IN COTTON-BALE TIES.

Specification forming part of Letters Patent No. 58,844, dated October 16, 1866.

*To all whom it may concern:*

Be it known that I, Z. W. LEE, of Blakely, in the county of Early and State of Georgia, have invented a new and useful Improvement in Cotton-Bale Ties; and I do hereby declare the following to be a full, clear, and exact description of the nature, construction, and operation of the same, reference being had to the accompanying drawings, which are made a part of this specification, and in which—

Figure 1:
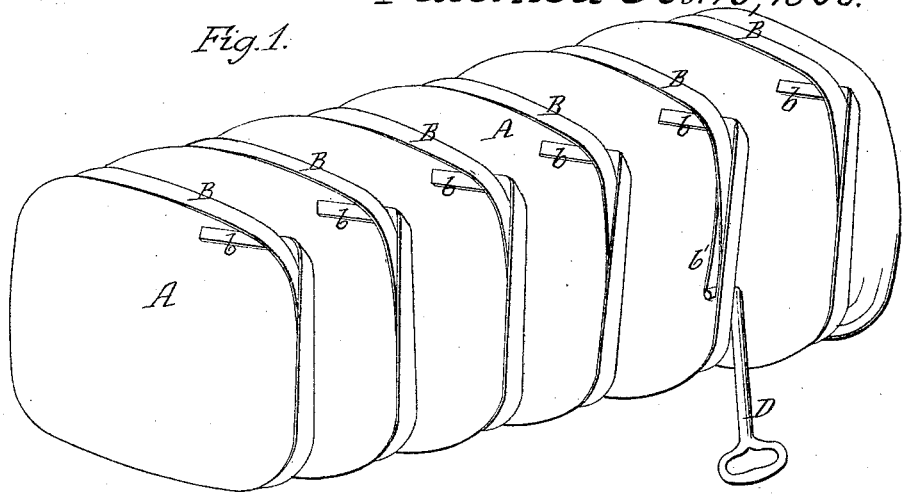
Figure 2:
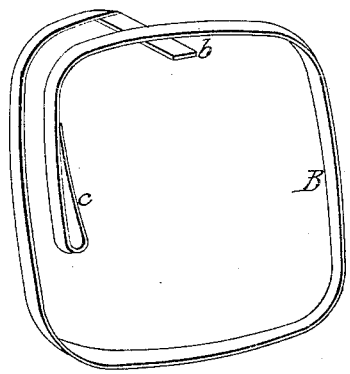
Figure 3:
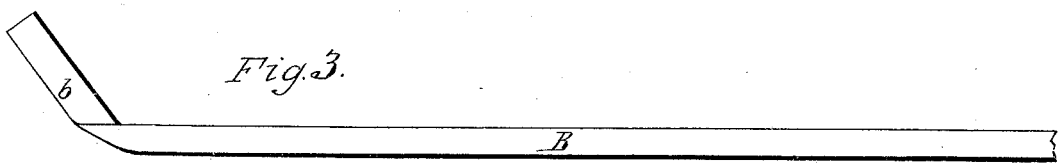

Figure 1 is a perspective view of a cotton-bale with the ties or bands applied according to my improved plan. Fig. 2 is a detached perspective view of one of the bands, showing it in the position it occupies when fast upon the bale. Fig. 3 is a perspective view of the band as it appears before being applied to the bale.

Similar letters of reference indicate corresponding parts in the several figures.

The bands or ties which constitute the subject of the present invention are composed each of a flexible strip of sheet metal, having one end bent at a suitable angle to enable the bent extremity to be inserted and clamped between the bale and the encircling portion or main body of the band, as hereinafter described.

In order that others skilled in the art to which my invention appertains may be enabled to fully understand and use the same, I will proceed to describe it in connection with the accompanying drawings.

A may represent a cotton-bale, and B the bands by which the bale is retained in its compact and compressed condition. These bands are each bent at one end, as at *b*, and in applying the band it is first placed around the bale, with the bent end *b* inserted between the bale and the encircling portion B of the band, as shown in Fig. 1, said bent extremity being situated upon or in the immediate vicinity of the bulging portion of the bale—that is to say, at the juncture of two sides of the bale, as represented. The bent portion *b*, being thus inserted under the band, is clamped firmly and immovably when the band is tightened up, and the straight underlapped portion of the band, being clamped beneath the outer fold, also aids in holding the band in position.

Herefore the method of fastening bands and rope upon the cotton-bale has rendered it necessary to cut the same in order to remove them from the bale before submitting the latter to the compress. It will be seen that in carrying out my invention I can readily remove the bands from the bale by drawing out the bent part *b* with a common cotton-hook.

The bands are applied as above described after the bale has been subjected to the compressing action of the farmer's screw; but after the bale has been acted upon by the general compress the consequent slack in the bands B is taken up, and the bands are retightened by bending up the straight underlapped portion, as shown at *b'*, and drawing the band firmly to the bale by means of the hook D. If preferred, the hook D may be used in this way to tighten the band at the farmer's screw, and the process repeated at the compress.

This method of constructing and applying the bands has had a practical test at the general compress at Savannah, Georgia, and it has been found that the bands permit less expansion of the cotton than rope, and after slight practice the bands can be applied with equal facility.

These bands, while characterized by the utmost simplicity of construction, are known to be quite as efficient in binding cotton-bales as the more complicated and costly arrangements hitherto devised.

Having thus described my invention, the following is what I claim as new herein and desire to secure by Letters Patent:

The metallic band B, having the bend *b* at one end and the loop *b'* at the other end, and applied substantially in the manner and for the purpose described.

Z. W. LEE.

Witnesses:
CHAS. D. SMITH,
SOLON C. KEMON.